United States Patent [19]

Young et al.

[11] Patent Number: 5,778,049
[45] Date of Patent: Jul. 7, 1998

[54] SERVICE ENGINEERING TEMPLATE

[75] Inventors: Jamie L. Young, Atlanta, Ga.; Rodney S. Britton, Allen; Kevin J. Farley, Richardson, both of Tex.

[73] Assignee: MCI Communications Corporation, Washington, D.C.

[21] Appl. No.: 673,744

[22] Filed: Jun. 26, 1996

[51] Int. Cl.$^6$ .............................. H04M 1/24; H04M 3/08
[52] U.S. Cl. .............................. 379/10; 375/15; 370/250
[58] Field of Search ................ 379/9–15, 1, 112, 379/111, 113, 133, 134, 135, 136, 201, 207, 219, 220, 230, 229; 395/701, 710; 370/250, 251

[56] References Cited

U.S. PATENT DOCUMENTS

| | | | |
|---|---|---|---|
| 5,241,580 | 8/1993 | Babson, III | 379/10 |
| 5,390,232 | 2/1995 | Freeman et al. | 379/10 |
| 5,548,640 | 8/1996 | Blondel et al. | 379/10 |
| 5,608,789 | 3/1997 | Fisher et al. | 379/207 |

*Primary Examiner*—Curtis Kuntz
*Assistant Examiner*—Paul Loomis

[57] ABSTRACT

A method and system for recording and tracking information related to telecommunication services. A centralized computer database system comprising a plurality of service engineering templates ('SETs') is provided. Each SET is created just prior to the deployment of a new service. Information related the deployment, operations, marketing, sales, maintenance and servicing of the new service is entered into the SET. SETs are continuously updated with current information throughout the life cycle of the telecommunications service. Each SET is linked with a central database repository that contains data related to network equipment and other resources that are used and/or available for use with the service associated with the SET. SETs are accessed by a plurality of organizations within a telecommunications company via 'views' that are customized according to the needs of the organizations. The most current data pertaining to each product represented by a SET is instantly available to each organization. The current and projected use of network resources on a network-wide basis is also instantly available.

21 Claims, 8 Drawing Sheets

SERVICE ENGINEERING TEMPLATE

BACKGROUND OF THE INVENTION

1. Field of the Invention

The present invention relates generally to telecommunications processes, and more particularly to an automated process for a centralized information system pertaining to deployment, installation, performance, maintenance, service and testing of telecommunications products and/or services.

2. Related Art

The telecommunications industry is constantly providing new products and services for its customers. Typically, when a new product is launched or 'rolled-out', an associated document is published which contains information pertaining to the operations, maintenance and service of the new product. The document is delivered to a large number of organizations within the telecommunications company in order to deploy, sell, install, test, and generally maintain the new product throughout its life cycle.

The number of organizations that require and receive such information can be numerous (typically 40–50, for a large telecommunications company). Thus, for each new product that is launched, a multitude of 'Operations and Maintenance' (O&M) manuals are distributed throughout a variety of organizations within a telecommunications company.

The O&M manuals are subsequently used by each organization to maintain each product. For example, service engineers consult O&M manuals for information pertaining to service procedures, test equipment, test parameters, troubleshooting techniques and the like. Sales information provided by such O&M manuals are used by order entry personnel when processing new orders for a particular service.

Similarly, O&M manuals are used by various network organizations in order to model the telephone network to support the new services. For example, network planning organizations consult product specific O&M manuals for information regarding the type and use of network equipment required by the new product. Information provided by a plurality of O&M manuals are used to update the telephone network with new and/or modified equipment.

O&M manuals are also used by various provisioning organizations. For example, such organizations consult O&M manuals to determine the provisioning steps required to provide a new service to a particular customer. These are just a few examples of the multitude of organizations that rely upon O&M manuals to deploy, sell, install, test, and generally maintain products throughout their life cycles.

Many problems are encountered using the conventional method as outlined above. Over time, changes occur that render the initial O&M manuals inaccurate. Such changes include modifications to the products or services themselves, as well as external changes that affect the products or services. For example, the implementation of a new telecommunications standard may require the use of new or modified test equipment in order to assure compliance with the new standard. Additionally, the implementation of a new standard may require software or hardware modifications to one or more existing telecommunication products. Thus, a single change to network standards may require a number of modifications to a plurality of different O&M manuals.

Similarly, changes in network architecture may require numerous modifications in a plurality of different O&M manuals. For example, the deployment of faster communication channels may render a number of products or services (or various features thereof), obsolete. The introduction of new and better test equipment may change the service and/or maintenance requirements for a number of different products.

Keeping up with the changes to the many different O&M manuals is a difficult task. It is clearly impracticable to re-publish and re-distribute each O&M manual every time a change occurs that requires an update as described herein. Thus, it is generally up to each organization to compile and maintain a list of updates regarding each O&M manual.

Typically, using conventional methods, only necessary and relevant modifications are maintained by each organization. Not every change is documented by every organization. Only changes that affect a particular organization are documented by the affected organization. For example, marketing organizations will generally not track changes regarding test equipment and service organizations will not track changes that only affect marketing organizations.

Typically, each affected organization documents the changes as they occur or as they are encountered by each organization. The number of changes that may affect a particular product or service during its life cycle can be numerous and each change may impact a multitude of organizations. Further, as stated, a single change may impact a multitude of O&M manuals.

Moreover, each organization typically uses its own methods and means to record and track the changes. Typically there is no centralized control over such updates to O&M manuals. Thus, one organization may rely on different and conflicting information than another organization. Once the initial O&M documentation becomes obsolete, current product information is disjointedly distributed across numerous organizations within the telecommunications company. Further, there is typically no single source that contains complete up-to-date information about a product or service. Consequently, errors, inefficiencies and inconsistencies occur, due to the lack of uniform information regarding each product and/or service.

For example, different trouble shooting procedures may be used by different service organizations to diagnose problems related to a particular service. This can lead to inconsistent problem determination and cause significant delays in resolving problems. Similarly, the lack of uniform information can lead to different testing criteria used by different organizations. This can lead to inconsistent results related to the performance and other characteristics associated with network products and/or services.

Thus, it would be highly desirable to maintain consistent and up-to-date information pertaining to a telecommunications company's products or services on a network-wide basis, where such information is available to all of the various network organizations within the company. Further, it would be desirable to coordinate the data associated with network resources used by each new product or service so that a such information can be updated and analyzed on a network-wide basis.

SUMMARY OF THE INVENTION

Accordingly, the present invention relates to a method and system for recording and tracking information for telecommunication services and products (hereinafter collectively referred to as "services"). The present invention provides a centralized computer database system comprising a plurality of Service engineering templates ('SET(s)'). Each SET is used to replace the traditional O&M manual. Service engineering templates are created just prior to the deployment of a new service. All information related to the deployment, operations, marketing, sales, maintenance and servicing of the new service is entered into the SET. In addition, each SET is linked to a central database repository that contains data related to network equipment and other resources that are used and/or available for use with the new service.

The types of network equipment provided by the centralized database repository linked with each SET include transmission, switching, and testing equipment that is currently available. Examples of other resources linked to each SET include network processes, procedures, standards and the like. The centralized database repository that contains the network equipment and network resources that is linked with each SET is referred to herein as the 'Network Resource Database' (NRD). The contents of the NRD is individually or collectively referred to as a 'Network Resource(s)' (NR(s)).

Throughout a service's life cycle, the SET associated with the service is continuously updated to reflect changes to the service and changes that affect the service. The person(s) responsible for updating each SET is referred to herein as the 'service engineer(s)'. Further, changes to a particular NR will automatically cause each SET that is linked with the NR to be updated. Additionally, SETs may be embedded with notifications to service engineers, alerting them that a new NR has been added to the NRD which may affect their SET.

Each of the various organizations within the telecommunications company has immediate access to the latest information contained within each SET. Further, the presentation of data or 'views' may be customized according to the needs of each particular organization. For example, a service organization may view a particular SET and be presented with information pertaining to the requirements and procedures for servicing the telecommunications service. A marketing organization may view the same SET but will be presented only with information pertaining to marketing, such as the performance, cost, and benefits related to the particular service. A provisioning organization may view the same SET but will be presented with the steps required to provision the service. Additionally, views can be easily altered and customized as needed.

Features and Advantages

A feature of the present invention is that it increases the efficiency and accuracy of installing, servicing and maintaining telecommunications services by providing complete up-to-date information about such services in a centralized location.

Another feature of the present invention is that it increases the efficiency and accuracy of installing, servicing and maintaining telecommunications services by providing a means for fast and efficient updates to service information that is immediately available to all telecommunications personnel.

An additional feature of the present invention is that it provides a means for monitoring network resources on a network-wide basis.

Yet another feature of the present invention is that it provides customizable views of the data pertaining to telecommunication services in order to facilitate the processes performed by various organizations within a telecommunications company.

Still another feature of the present invention is that it provides automatic updates to the data pertaining to a plurality of telecommunication services by updating one or more network resource(s) associated with such services.

An advantage of the present invention is that it provides a means to insure timely updates to data related to telecommunication services.

Another advantage of the present invention is that it provides remote access to the data pertaining to telecommunications services.

Further features and advantages of the invention, as well as the structure and operation of various embodiments of the invention, are described in detail below with reference to the accompanying drawings. In the drawings, like reference numbers generally indicate identical, functionally similar, and/or structurally similar elements.

BRIEF DESCRIPTION OF THE FIGURES

The present invention will be described with reference to the accompanying drawings, wherein.

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

Figure 1:
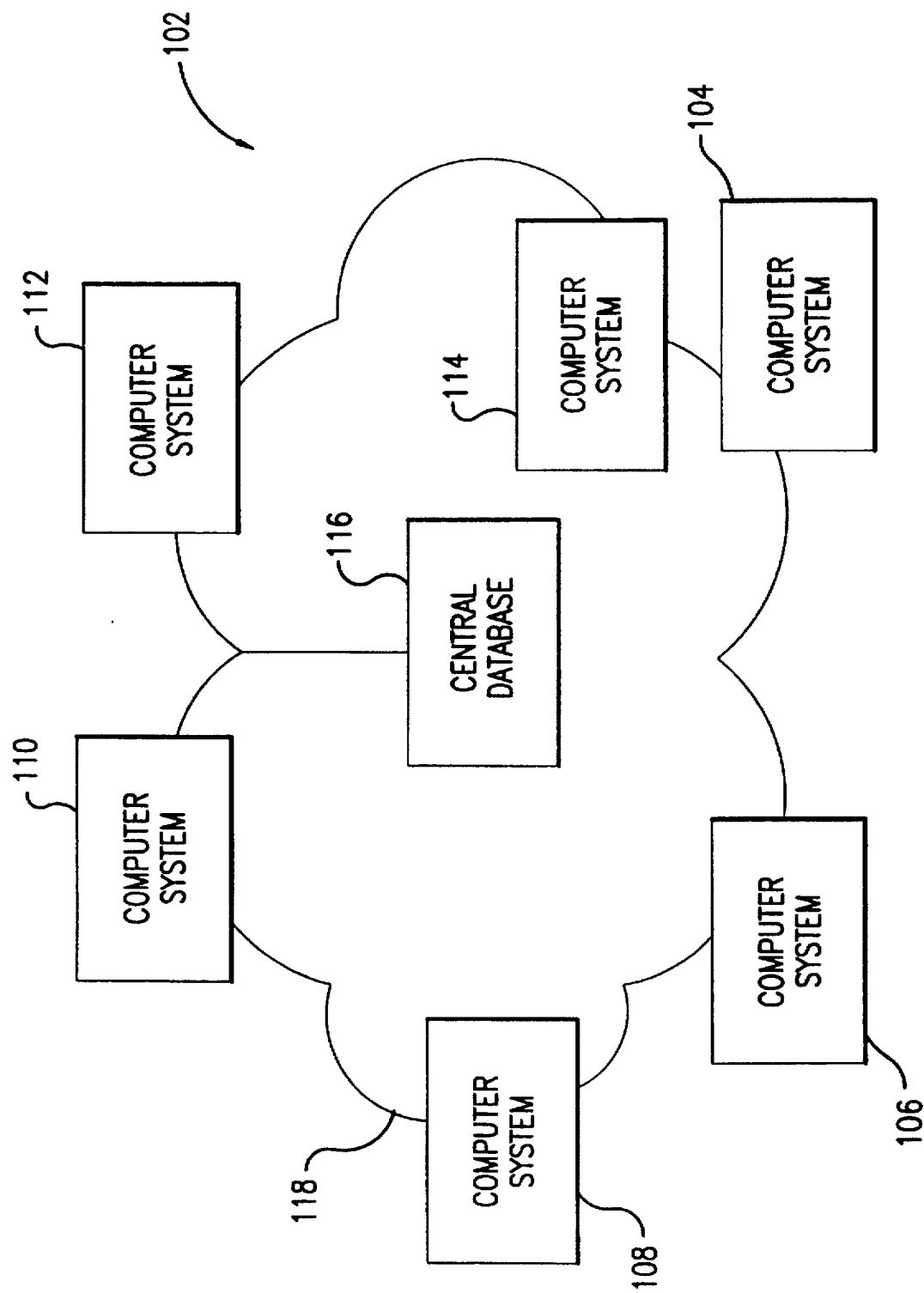
FIG. 1 is a block diagram of a data processing system according to an embodiment of the present invention.

FIG. 1 is a block diagram of a data processing system 102 according to an embodiment of the present invention. The data processing system 102 includes a number of computer systems 104–114 and a centralized database 116, each connected to a computer network 118.

Figure 3:
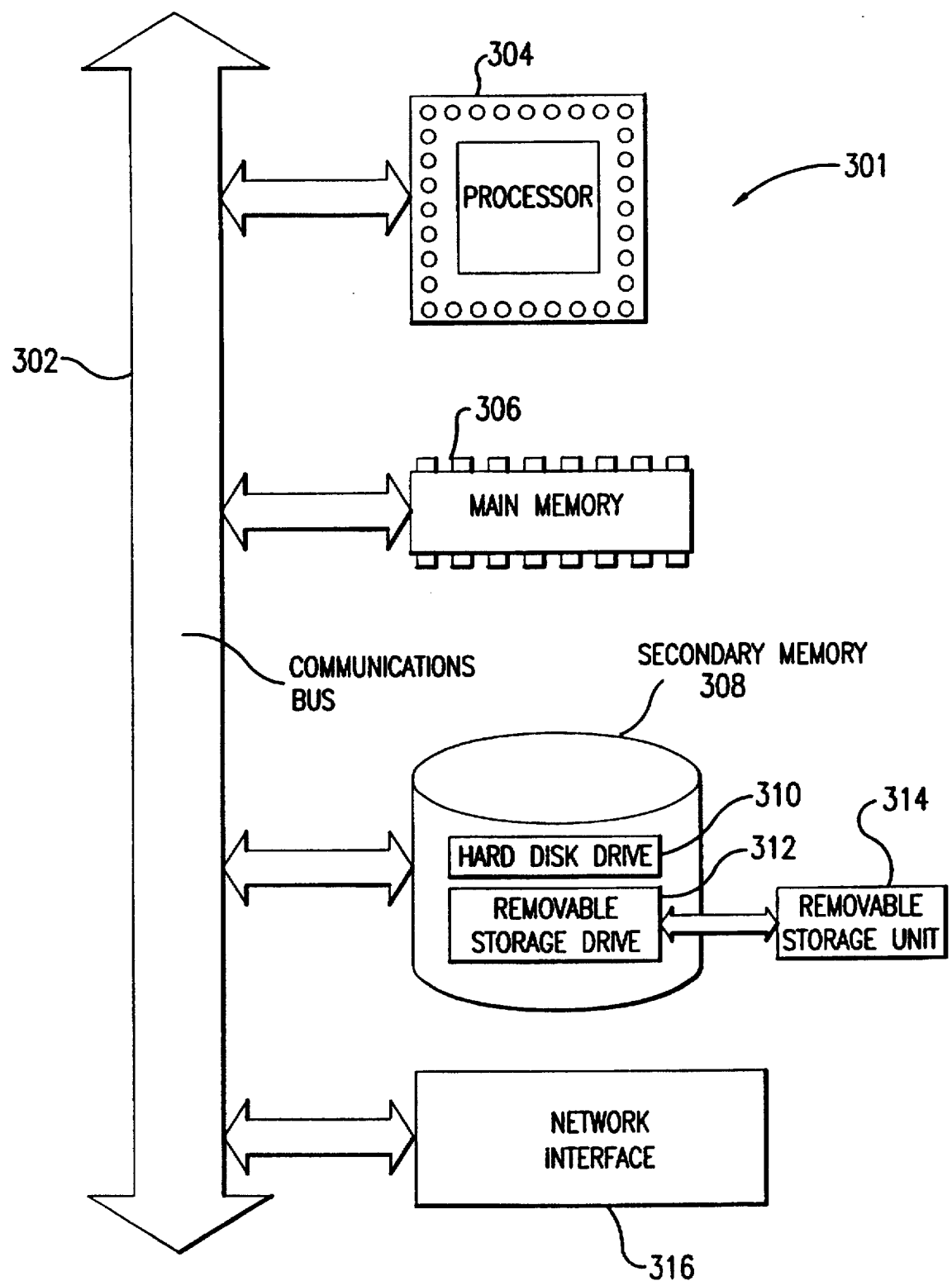
FIG. 3 is block diagram of a computer useful for implementing components of the present invention.

The present invention provides for the manipulation and monitoring of the data in the centralized database 116 by the computer systems 104–114. The computer systems 104–114 are typically located in various locations comprising a multitude of organizations within a telecommunications company. Remote access via telephone lines are also provided via links between a telephone network (not shown) and the computer network 118. Accordingly, access to the centralized database can occur from fixed locations such as data communications centers within a telecommunications company or from remote locations such customer sites or field locations. In one embodiment, the computer systems 104–114 may be each embodied in a general computer system. An exemplary computer system 301 is shown in FIG. 3. The computer system 301 includes one or more processors, such as processor 304. The processor 304 is connected to a communication bus 302.

The computer system 301 also includes main memory 306, preferably random access memory (RAM), and a secondary memory 308. The secondary memory 308 includes, for example, a hard disk drive 310 and/or a removable storage drive 312, representing a floppy disk drive, a magnetic tape drive, a compact disk drive, etc. The removable storage drive 312 reads from and/or writes to a removable storage unit 314 in a well known manner.

Removable storage unit 314, also called a program storage device or a computer program product, represents a floppy disk, magnetic tape, compact disk, etc. As will be appreciated, the removable storage unit 314 includes a computer usable storage medium having stored therein computer software and/or data. The computer system 304 also includes a network interface 316 which provides for communication via the computer network 118 as discussed herein.

Computer programs (also called controllers) are stored in main memory and/or the secondary memory 308. Such computer programs, when executed, enable the computer system 301 to perform the features of the present invention discussed herein. In particular, the computer programs, when executed enable the processor 304 to perform the features of the present invention. Accordingly, such computer programs represent controllers of the computer system 301.

Figure 2:
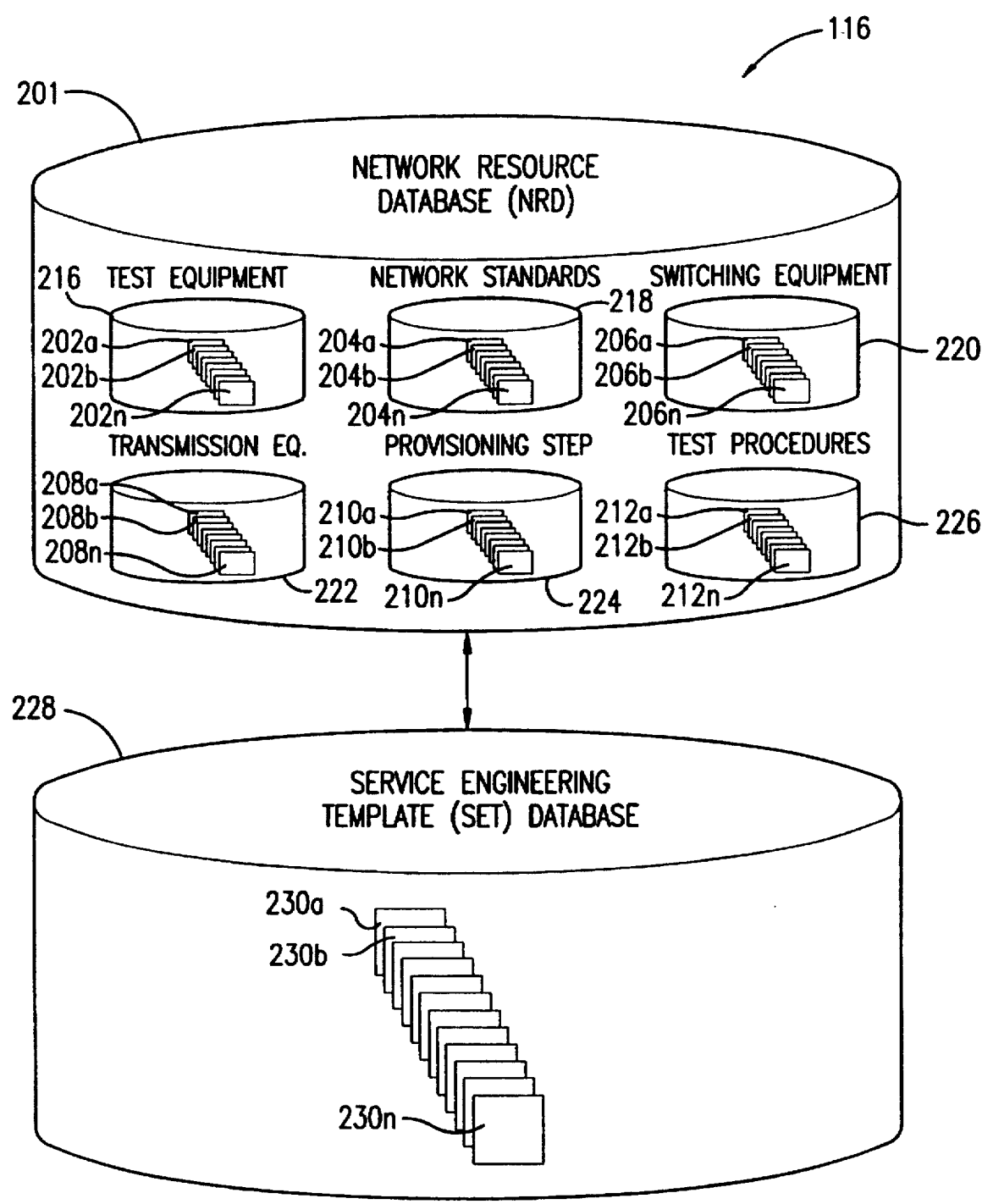
FIG. 2 is a block diagram of a centralized database according to an embodiment of the present invention.

In another embodiment, the invention is directed to a computer program product comprising a computer readable medium having control logic (computer software) stored therein. The control logic, when executed by processor 304, causes the processor 304 to perform the functions of the invention as described herein. The centralized database 116 according to an embodiment of the present invention will now be described with reference to FIG. 2. The centralized database comprises a Network resource database (NRD) 201 and a Service Engineering Template (SET) database. The NRD and the SET are linked to each other via the datalink 232. Note that the datalink 232 is bidirectional indicating that data communications can occur in either direction to and from each database 201 and 228.

The NRD 201 comprises a plurality of resource databases 216–226. The plurality of resource databases 216–226 are arranged into categories, where each category represents a particular type of network resource. For example, the resource database 216 represents network resources of the type 'Test Equipment'. As such, each entry 202a, 202b, ... 202n (generally 202), represents a particular type (i.e. make, model, etc.) of test equipment. For example, test equipment entry 202a may represent a particular signal generating device, and test equipment entry 202b may represent a particular signal processing device.

Similarly, the resource database 218 represents network resources of the type 'Network Standards'. As such, each entry 204a, 204b, ... 204n (generally 204), represents a particular network standard. The resource database 220 represents network resources of the type 'Switching Equipment'. As such, each entry 206a, 206b, ... 206n (generally 206), represents a particular type of switching equipment.

Likewise, the resource database 222 represents network resources of the type 'Transmission Equipment' and each entry 208a, 208b, ... 208n (generally 208), represents a particular type of transmission equipment. The resource database 224 represents network resources of the type 'Provisioning step' and each entry 210a, 210b, ... 210n (generally 210), represents a particular step in a provisioning process. The final example of a resource database depicted in the NRD 201 is the resource database 226. The resource database 226 represents network resources of the type 'Test Procedures'. As such, each entry 208a, 208b, ... 208n (generally 208), represents a particular test procedure.

The Service Engineering Template (SET) database 228 comprises a plurality of SETs 230a, 230b, ... 230n (generally 230). Each SET comprises data pertaining to the deployment, installation, performance, maintenance, service and testing of telecommunications service. An example of the contents of each SET is subsequently described herein. Much of the data comprising each SET 230 is represented by pointers or references to the resources within the NRD 201 as described below.

Information pertaining the network resources 216–226 within the NRD 201 is not directly stored within each SET 230. Instead pointers that reference one or more entries in the NRD 201 are stored within each the SET 230. This aspect of the present invention is depicted in a block diagram of a SET according to an embodiment of the present invention in FIG. 4. Accordingly, the SET 230 refers to the network resource corresponding with the test procedure entry 212n within the resource database 226.

Similarly, the SET 230 refers to the network resource corresponding with the network standards entry 204n within the resource database 218. In the same fashion, (proceeding clockwise from the network resource 216), the SET 230 refers to the network resources corresponding with the entries 202n, 206n, 208n and 210n within the resource databases 216, 220, 222 and 224 respectively.

Figure 4:
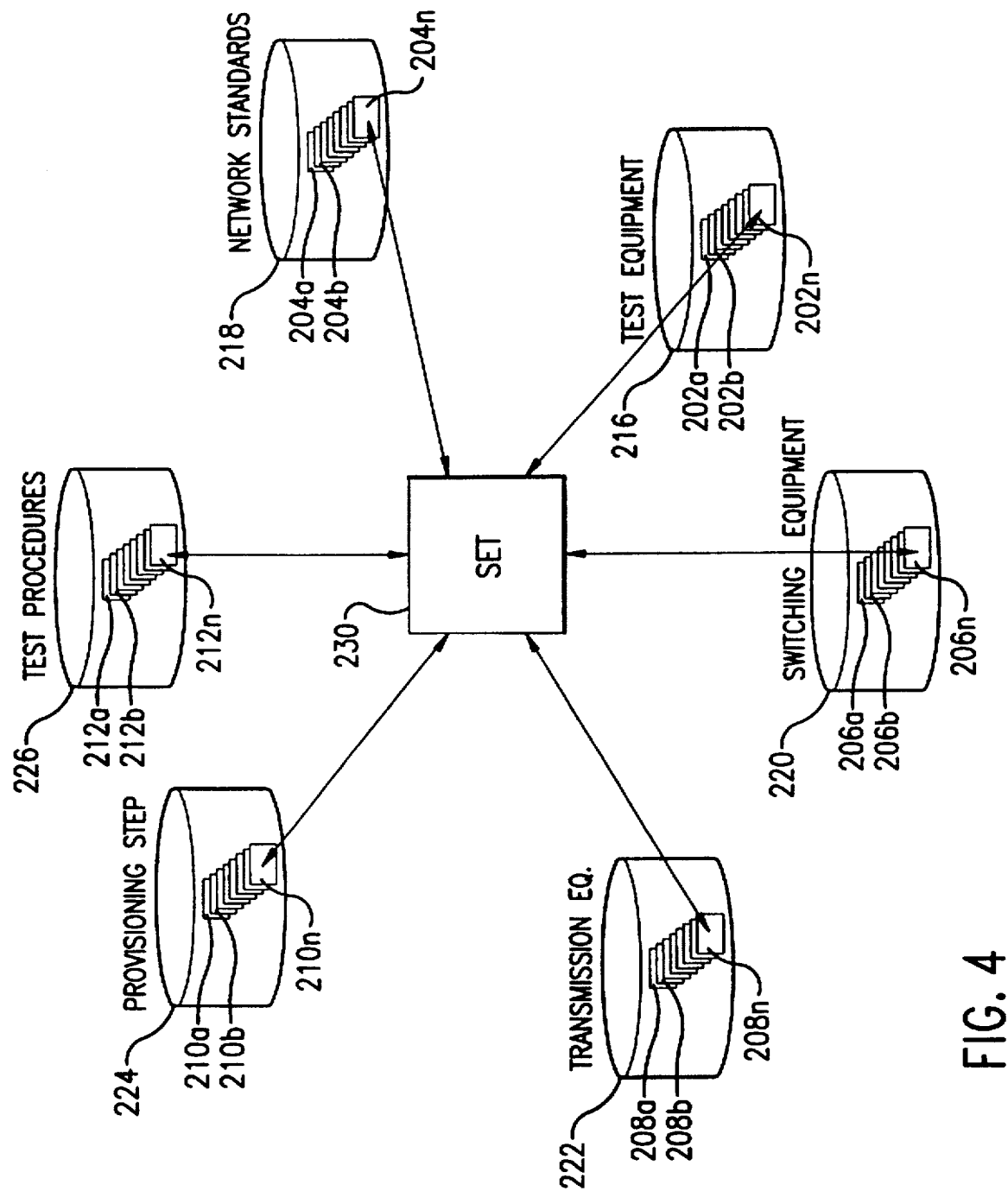
FIG. 4 is a block diagram depicting the association between a service engineering template and network resources according to an embodiment of the present invention.

Note that the pointers depicted in FIG. 4 are all bidirectional. The pointers that point in the direction from the SET 230 to the resource databases 216–226, are stored within each SET and refer to a particular NR, as described above. The pointers that point in the opposite direction (from each NR entry to the SET 230), are stored within each NR (such as NR 212a), that refer to a particular SET. By examining the pointers stored within a particular NR (such as NR 212a), all of the SETs that use the NR can be determined. Thus the use of network resources on a network-wide basis is accomplished. This aspect of the present invention will be described below.

Figure 5:
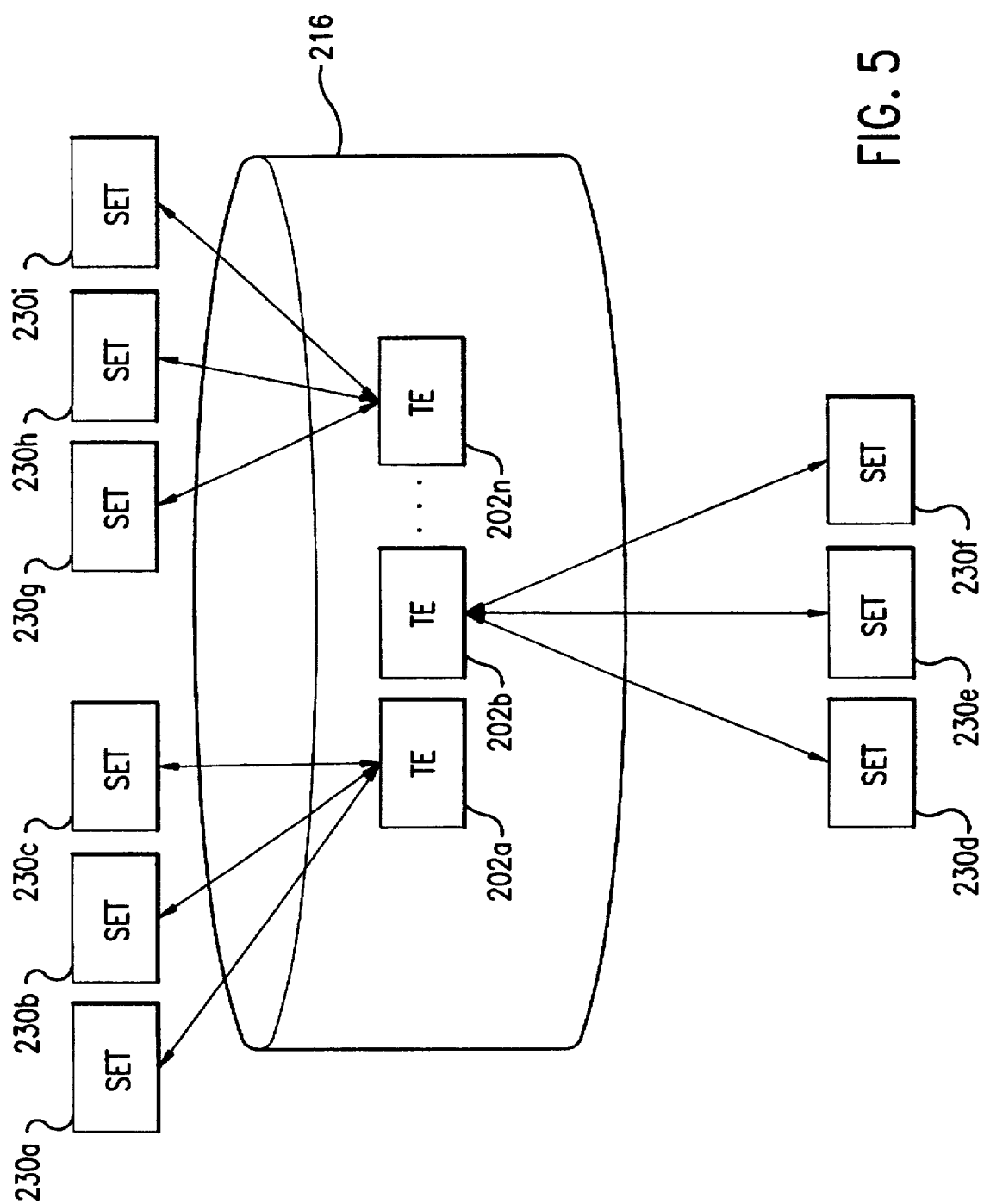
FIG. 5 is a block diagram depicting a resource database according to an embodiment of the present invention.

Referring now to FIG. 5, a detailed view of one resource database 216 is presented. As stated, resource database 216 represents network resources of the type 'Test Equipment'. As such, each entry, represents a particular type of test equipment (TE). As shown in FIG. 5, test equipment entry 202a points to three individual SETs, 203a, 230b, and 230c. Similarly, test equipment entry 202b points to an additional three SETs, 203d, 203e, and 203f. Finally, test equipment entry 202n points to three more SETs, 203d, 203e, and 203f.

Each individual SET that refers to a particular network resource, such as the NR 202a, provides information to the NRD that refers back to itself, as shown by the bi-directional pointers depicted in FIG. 4. In this fashion, a network planning organization can view a particular network resource (such as NR 202a), within the NRD 201, and determine all of the products that use the network resource. This new view of the Network as provided by the present invention, facilitates the task of modeling the network by providing equipment and resources required by a plurality of new services as defined by a plurality of SETs.

Further, this aspect of the present invention provides for automatic updates of SETs whenever a particular NR (such as NR 202a) is changed. For example, suppose the test equipment represented by NR 202a is updated with a new model that has greater testing capabilities than the old model. Further suppose that the testing capabilities of the new model is a superset of testing capabilities of the old model. Thus, all telecommunication services that are currently being tested with the old model can and should switch to the new model.

This is automatically accomplished according to the present invention, by updating the entry 202a with information corresponding to the new model. Accordingly, each SET 230a, 230b, and 230c, automatically refers to the new model of test equipment represented by the updated NR entry 202a. Thus, the next time service personal view any of the SETs 230a, 230b, or 230c, he or she will be presented with data related to the new model of test equipment. This assures that all service personal will be using the most current model of test equipment.

In another example, suppose that the new model of test equipment performs some of the functions of the old model, but not all. In this case, not all of the SETs that refer to the NR 202a should switch to the new model. Thus, instead of updating the NR 202a directly, a new NR (not shown) is entered into the resource database 216. Further, a notification message is entered into the NR entry that represents the old model (NR 202a). This message alerts the associated SET's service engineers that an update may be required. This can be performed in many ways depending on the specific implementation of the present invention.

In one embodiment, a message is electronically sent to the service engineer assigned to each SET being referred to by the NR 202a. A message sending procedure is invoked by the administrator that is adding the new NR (not shown). The message sending procedure queries each SET associated with the NR 202a for an address (such as an E-Mail address) of the assigned service engineer. Next, a message is submitted and sent to each service engineer. The message comprises information pertaining to the characteristics of the new network resource and alerts the service engineer that an update to his or her SET may be necessary. Finally, each service engineer makes a determination as to whether to update their SET(s). If an update is appropriate the service engineer uses the maintenance facility (described below) to update their SET(s) accordingly.

In another embodiment, in addition to (or in lieu of), the message sending procedure above, a message is posted within each associated SET, that contains the same information pertaining to the new resource as described above. In this fashion, the next time the service engineer views his or her SET(s), the update alert is automatically provided. Additionally, some form of automation may be employed. For example, a process may be implemented wherein SETs with particular characteristics are automatically updated. For example, suppose in the above example, only those services that adhere to a particular network standard should be updated. Thus, such a procedure queries each associated SET to determine if such SET refers to a particular network standard resource, such as NR 204a. If a match is found, only those SETs are adjusted so that their NR pointers that previously pointed to the NR 202a, now points to the new NR (not shown). In addition, the message sending and/or posting procedures described above may be used for the associated SETs that do not adhere to the network standard.

In addition, many other procedures can be used to perform the functions as described above. In some cases, where security and/or data integrity is a prime concern, processes that automatically update one or more SETs 230 may not be desired. For example, in some cases, it may be desired to only allow service engineers to update their own SETs. This would avoid inadvertent and erroneous updates to SETs by personnel that are not personally familiar with each SET. In any case the implementation of such procedures would be apparent to persons skilled in the relevant art(s).

Figure 7:
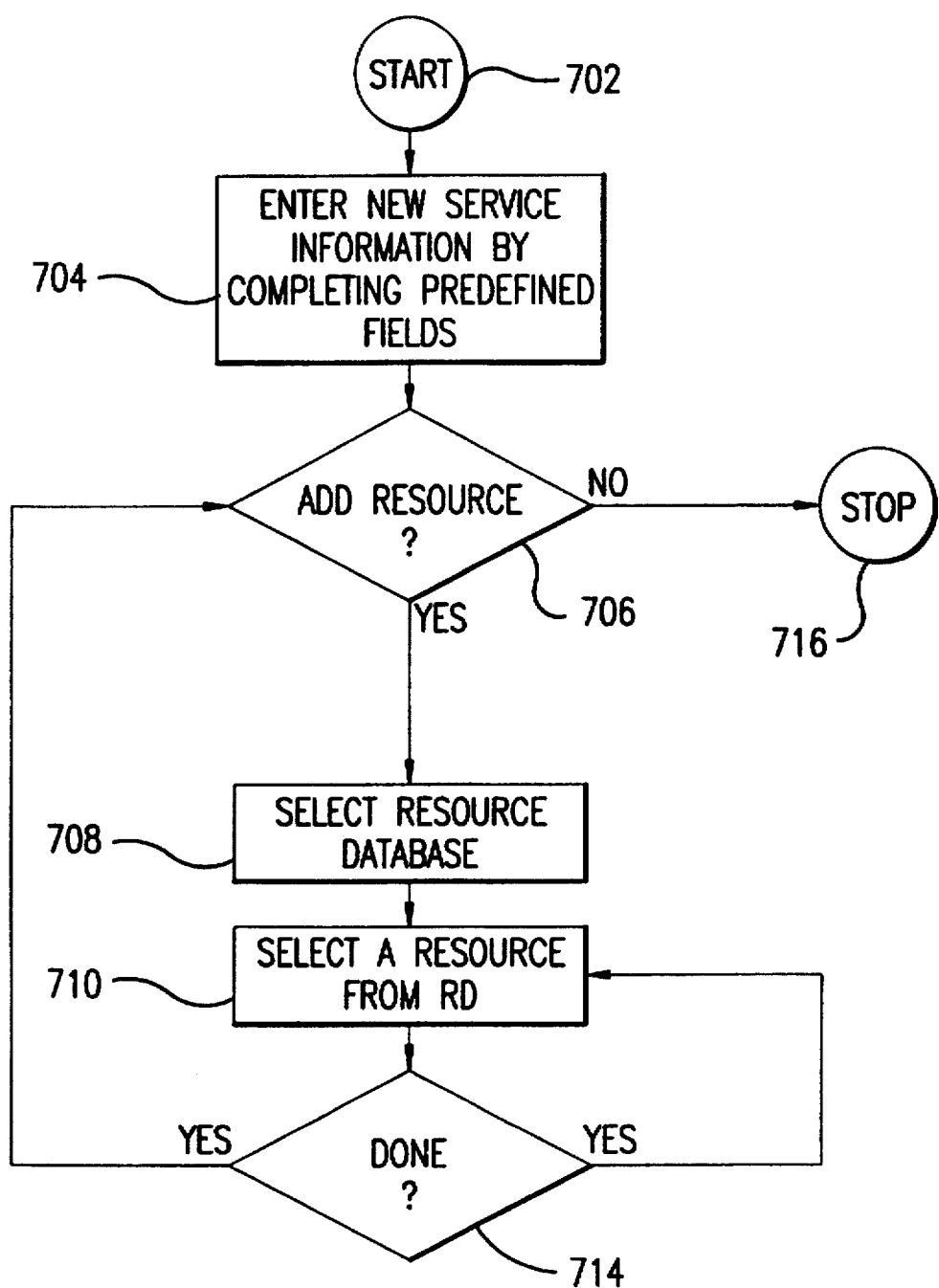
FIG. 7 is a flowchart depicting a process used to create a SET according to an embodiment of the present invention.

An example of a process for creating a SET will now be discussed with reference to the flowchart in FIG. 7. A SET is created by one or more service engineer(s) (hereinafter referred to in the singular), in conjunction with service creation groups, planning organizations, engineering groups and the like. The service engineer gathers data from the various organizations to be input into the SET.

The process to create a new SET begins with step 702 where control immediately passes to step 704. In step 704 the service engineer enters information about the new service by filling-in pre-defined fields in the SET. Pre-defined fields are provided to facilitate entering information into the SET. The pre-defined fields enable such information to be entered in a familiar, timely and orderly fashion. Some fields require textual responses while others are presented as a list of choices that are simply selected by the service engineer.

Some examples of pre-defined fields include an identification of the service engineer and the name and description of the new service. In addition, marketing information such as the cost, performance and benefits over other services are entered into the SET. Further, a list of the known organizations that will be involved with the new service is entered into the SET. Typically a list of known limitations and/or problems are provided to the SET. Service information is entered as well. Information related to the expected use of the new service is also provided. Finally, free text fields are provided so that additional information not addressed by the pre-defined fields may be entered.

Next control passes to step 706. In step 706 the service engineer may add a network resource. If a network resource is to be added, control passes to step 708. In step 708 a list of the resource databases 216–226 as defined in the NRD 201 is presented. The service engineer selects one of the resource databases in step 708. Next, in step 710, a list of the entries within the selected resource database is presented. The service engineer selects one or more of the resources from the list.

For example, suppose in step 708, the service engineer selects the 'Transmission Equipment' 222 resource database. In this case, a list of transmission equipment will be presented in step 710. From this list, the service engineer selects one or more entries from the list of transmission equipment that is to be used by the new service. Next control passes to step 714. In step 714 the service engineer decides whether to select another resource from the currently selected resource database. In this case, if one or more entries in the transmission equipment database 222 is to be associated with the SET, control passes back to step 710 where one or more entries may be selected. If the service engineer is finished with this particular resource database (222 in this example), control passes back to step 706 where another resource database may be selected.

If no more resources are to be selected, control passes to step 716 and the process ends. Thus, the process of associating a SET with network resources involves nothing more than selecting items from a list. In this fashion, the SET completely describes all aspects of the new service. For example, the steps required to provision the new service is entered into the SET by selecting each provisioning step 210a–210n in the order that each step is to be performed. Information that is unique to a provisioning step may be entered into the SET. Likewise, the specifics of the test procedures that are to be used to test the new service are entered into the SET by selecting each test procedure 212a–212n. The network standards that apply to the new service are specified by selecting one or more of the entries 204a–204n.

Figure 6:
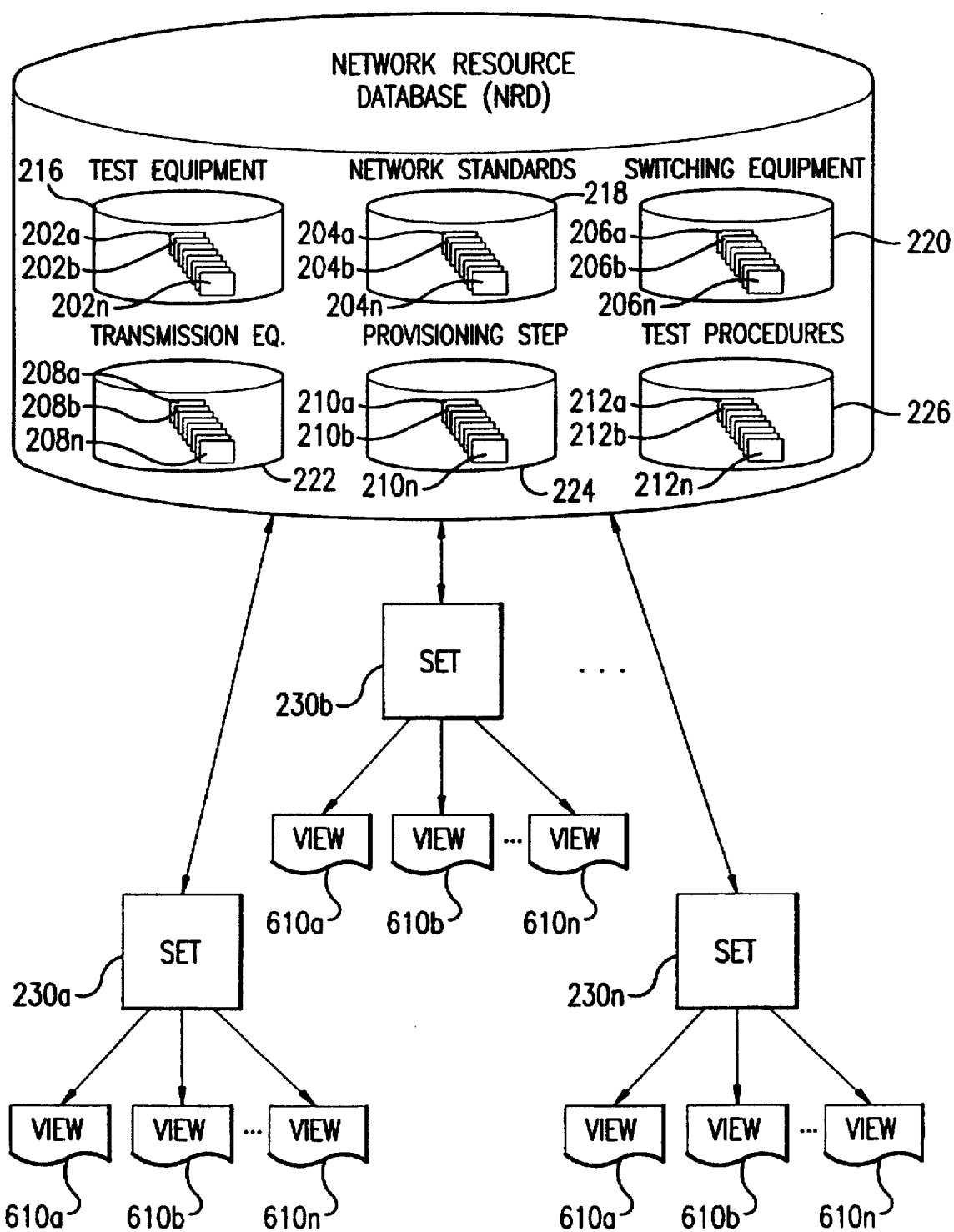
FIG. 6 is a block diagram depicting the display view of SETs according to an embodiment of the present invention.

A block diagram depicting the viewing feature of the SETs according to an embodiment of the present invention will now be described with reference to FIG. 6. All of the information stored within each SET is not applicable to all organizations. Accordingly, each SET is viewed differently, according to the needs of each organization. For example, a service organization may view a particular SET and be presented with information pertaining to test procedures and the like. A marketing organization may view the same SET but will be presented with information pertaining to marketing, such as the performance, cost, and benefits related to the particular service. A provisioning organization may view the same SET but will be presented with the steps required to provision the service.

Accordingly, each SET 230a, 230b, . . . , 230n within the SET may be viewed using any of the predefined views 610a, 610b, . . . 610n (generally 610). Each predefined view 610 is customized (by a view administrator) according to the needs of each associated organization. Further each view may be further customized by individual users upon request. Data within the SETs 230 themselves and/or the data provided by the NRD 201 (via the associated links, as previously described), may be presented in the views 610. Various well known and widely available database tools may be used to implement the customized view feature of the present invention. As such the specific implementation of this feature will be apparent to persons skilled in the relevant art(s).

Figure 8:
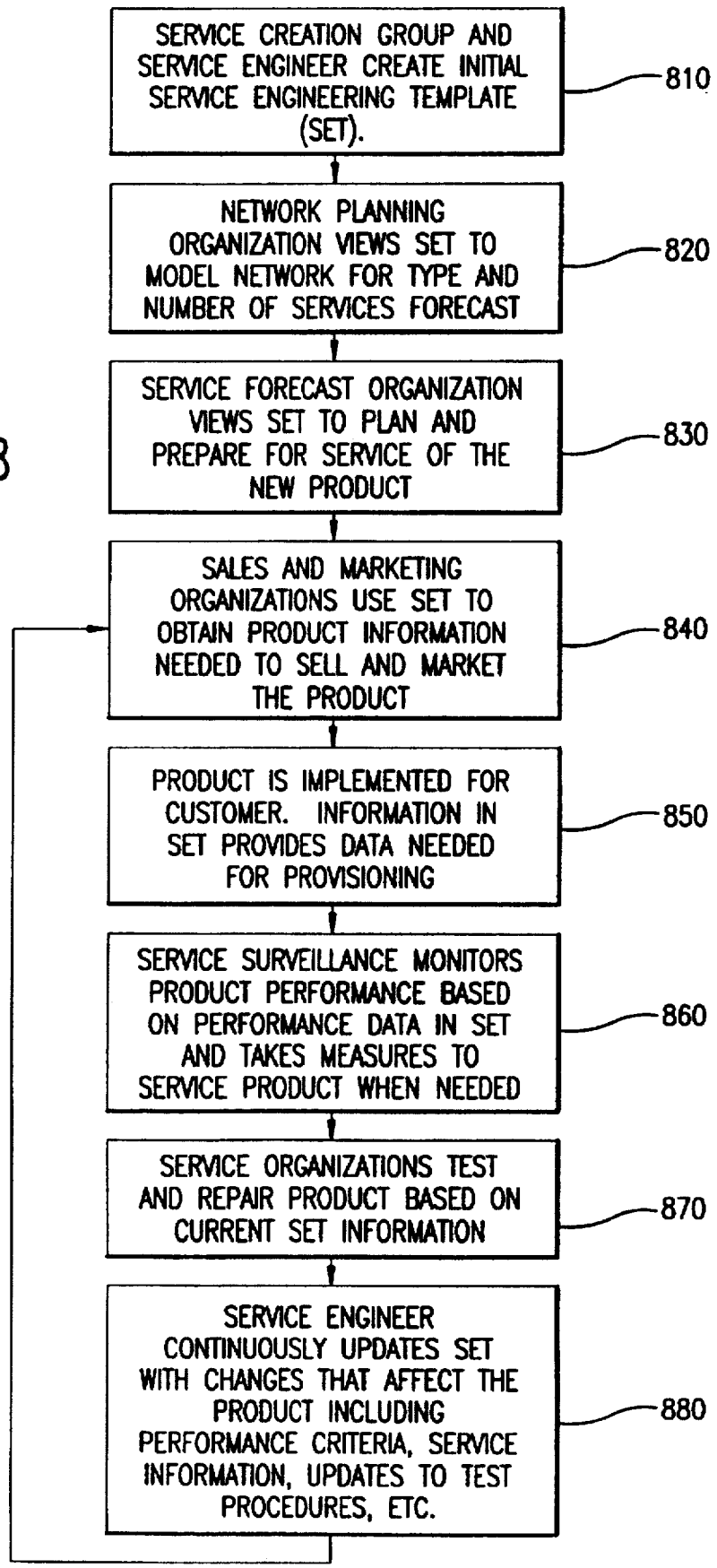
FIG. 8 is a block diagram depicting a typical scenario involving the use of a SET by various organizations according to an embodiment of the present invention.

Referring now to FIG. 8, a typical scenario involving the use of a SET by various organizations throughout the life cycle of a new product is depicted. In step 810, a service creation group creates an initial SET. A service creation group is an organization that defines a new telecommunications service both in terms of feature functions, and operational components needed to implement the new service. All relevant information that is known at the time of roll-out is initially entered into the SET. Such information is typically compiled by a service creation group in conjunction with other organizations such as service and design engineering groups.

The initial service description includes implementation requirements, marketing strategy, lists of relevant telecommunication organizations, order entry rules, engineering rules for provisioning the service, test, maintenance and performance data, and a list of known problems and resolutions. Additionally, initial SET data includes forecast information that provides projections of expected demand for the new service. Such projections and requirements are typically broken down by geographical regions within the telephone network infrastructure.

The forecasting data contained in the SET enables a network planning organization to model the telephone network for the new service, as shown in step 820. The network planning organization provides changes to the telephone network required to support the new service. Modeling the network includes implementing changes to network architecture as well as changes to telecommunication processes and/or procedures. For example, a new service may require additional transmission lines in particular areas in order to manage the anticipated need for the new service in those areas. The network planning organization uses the data contained in the SET to facilitate such network modeling. As previously stated, network resources on a network-wide basis can be determined by viewing each resource entry (such as NR 202a), within the NRD 201, to determine all of the products (associated SETS) that use the resource.

In step 830, a service forecast organization views service rules contained in the SET in order to plan and prepare for the servicing of the new service. This may include acquiring additional equipment, and/or personnel etc., needed to meet the specified service requirements described in the SET.

In step 840, sales and marketing organizations view data in the SET. The SET defines what feature functions are available and contains order rules that enable a sales organization to take orders from customers for the new service. These rules include how to determine the best configurations for customers depending on particular customer requirements and environments. Complete order entry rules are included to enable the telecommunications company to begin taking orders for the new service.

The data in the SET also contains information that is relevant to marketing organizations. Data contained in the SET facilitates the marketing of new services by providing information that may be included in promotional material used for advertising, such as sales literature and the like.

In step 850, engineering rules contained in the SET allows for provisioning of the new service. The engineering rules define the provisioning steps needed to implement the new service for a particular customer. This may include interfacing with other service providers. For example, an interchange carrier (IXC) may need to coordinate efforts with a local exchange carrier (LEC), in order to implement the new service for a particular customer. This may involve for example, changing switch software, or providing additional transmission media such as new trunk groups or dedicated access lines.

In step 860, a service surveillance organization monitors the new service based on performance information contained in the SET. Additional data defines how the service is to be monitored for performance evaluation. The SET also defines the criteria for the expected level of performance. Performance guidelines provided in the SET defines alarm threshold parameters and the like. Service personnel are alerted if the service falls below pre-defined engineered parameters so that measures can be taken to correct the problem. Such measures are also contained in the SET as subsequently discussed below.

In step 870, service organizations rely on current information contained in the SET to service and repair the service throughout its life cycle. This includes instructions in a cook-book like fashion on how to service the telecommunications service. As new information is discovered and new techniques are defined, the SET is updated by the service engineer as part of the maintenance function of the SET (step 880, below). Service information including data relevant to parts, materials, tools, and other equipment, including the sources and availability of the same, are included in the SET. Safety information relevant to service is included as well.

As step 880 indicates, the SET is continuously updated by the service engineer with current information throughout the service's life cycle. The maintenance function allows service engineers to continuously update the SET whenever there is any change to the service or any change to other network components or services that affect the service. Such changes include changes to the telephone network architecture, new service performance criteria, new test procedures and or changes to any of the feature functions of the service.

As the arrow from step 880 indicates, steps 840–880 is a continuing process that takes place throughout the life cycle of a service. Changes to the service are continuously updated and immediately reflected in the SET. Any organization that views the SET will always be viewing a current version which eliminates the chance of anyone relying on outdated information. Therefore, there is always complete up-to-date information about a service available to the plurality of organizations that view such data via their own customizable views of the SET.

For example, in step 840, each time a sales organization views the SET the latest changes are reflected in that view, enabling the organization to immediately react to changes that affects their sales procedures. For example, suppose a feature function is no longer available due to changes to the telephone network that render the function obsolete. The next time the service is ordered, the order entry organization views the SET which informs them of the change to the service offering and such feature will not be offered to the customer.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for providing information related to telecommunication services comprising:

first data entry means for defining and updating service engineering templates;

second data entry means for defining and updating network resources including telecommunication transmission and switching equipment;

first storage means for maintaining a plurality of service engineering templates;

second storage means for maintaining a plurality of network resources;

association means for selectively linking said network resources with said service engineering templates, thereby causing automatic updates of said service engineering templates whenever linked network resources are updated via said second data entry means; and presentation means for displaying said service engineering templates and said network resources.

2. The system of claim 1, wherein said presentation means includes views that are customized according to predefined specifications.

3. The system of claim 1, wherein said presentation means includes a display of total use of said network resources on a network-wide basis.

4. The system of claim 1, wherein said presentation means includes a display of projected use of said network resources on a network-wide basis.

5. The system of claim 1, wherein said first data entry means includes a plurality of predefined data entry fields and a list of said network resources, whereby said service engineering templates are defined and updated by filling-in said predefined data entry fields and by selectively choosing said network resources from said list of said network resources.

6. The system of claim 1, wherein said association means includes a pointer within each service engineering template that identifies each network resource selected by said first data entry means.

7. The system of claim 1, wherein said association means includes a pointer within each network resource that identifies each service engineering template that selects each network resource by said first data entry means.

8. The system of claim 1, wherein said first storage means comprises a centralized service engineering template database.

9. The system of claim 1, wherein said second storage means comprises a centralized network resource database.

10. The system of claim 1, wherein said information related to telecommunication services comprises at least one of:

a description of said service;

sales information;

marketing information;

implementation requirements;

list of organizations associated with said service;

order entry rules;

sequence of provisioning;

testing requirements;

maintenance requirements;

performance and failure criteria; and problem resolution.

11. The system of claim 1, wherein said network resources further comprise at least one of:

test equipment, network standards, provisioning steps and test procedures.

12. The system of claim 11, wherein said network resources further comprises provisioning steps, network standards, and test procedures.

13. A method for maintaining a telecommunications service comprising the steps of:

automatically creating a centralized service engineering template associated with the telecommunications service, by filling-in a plurality of predefined data entry fields and selecting at least one network resource from a list of network resources;

automatically linking said at least one network resource with said service engineering template;

accessing, via a communications network, said service engineering template by a plurality of organizations within a telecommunications company;

maintaining current information by updating said central service engineering template whenever a change occurs that affects the telecommunications service; and maintaining current information by updating a network resource from said list of network resources, thereby causing automatic updates to service engineering templates that are linked with said network resource.

14. The method of claim 13, wherein said service engineering template comprises at least one of:

a service description;

a marketing strategy;

implementation requirements;

a list of organizations associated with said service;

order entry rules;

sequence of provisioning;

test requirements;

maintenance requirements;

performance and failure criteria; and problem resolution requirements.

15. The method of claim 13, wherein said accessing step includes viewing said service engineering templates via views that are customized according to requirements of each said plurality of organizations.

16. The method of claim 13, wherein said accessing step includes a view of said network resources on a network-wide basis.

17. A computer program product comprising a computer useable medium having computer program logic stored therein, said computer program logic for enabling a computer to provide information related to telecommunication services, wherein said computer program logic comprises:

means for enabling the computer to define and update service engineering templates;

means for enabling the computer to define and update network resources including telecommunication transmission and switching equipment;

means for enabling the computer to maintain a plurality of service engineering templates;

means for enabling the computer to maintain a plurality of network resources; means for enabling the computer to selectively link said network resources with said service engineering templates, thereby causing automatic updates of said service engineering templates whenever associated said network resources are updated; and means for enabling the computer to display said service engineering templates and said network resources.

18. The computer program product of claim 17, wherein said means for enabling the computer to display includes means for enabling the computer to display views that are customized according to predefined specifications.

19. The computer program product of claim 17, wherein said means for enabling the computer to display includes means for enabling the computer to display a view of total use of said network resources on a network-wide basis.

20. The computer program product of claim 17, wherein said means for enabling the computer to display includes means for enabling the computer to display a view of projected use of said network resources on a network-wide basis.

21. The computer program product of claim 17, wherein said means for enabling the computer to define and update a plurality of service engineering templates includes means for enabling the computer display a plurality of predefined data entry fields and a list of said network resources, whereby a user updates and defines said service engineering templates by filling-in said predefined data entry fields and selectively choosing said network resources from said list of said network resources.

* * * * *